United States Patent [19]
Gosselin et al.

[11] Patent Number: 5,762,390
[45] Date of Patent: Jun. 9, 1998

[54] UNDERACTUATED MECHANICAL FINGER WITH RETURN ACTUATION

[75] Inventors: Clément M. Gosselin, Charlesbourg; Thierry Laliberté, Loretteville, both of Canada

[73] Assignee: Université Laval, Québec City, Canada

[21] Appl. No.: 680,824

[22] Filed: Jul. 16, 1996

[51] Int. Cl.$^6$ ........................................... B25J 15/10
[52] U.S. Cl. ........................... 294/106; 294/907; 901/33; 901/39
[58] Field of Search .................. 294/106, 111, 294/115, 907; 901/31–36, 39, 46; 623/57, 63–65

[56] References Cited

U.S. PATENT DOCUMENTS

| | | |
|---|---|---|
| 3,694,021 | 9/1972 | Mullen . |
| 3,866,966 | 2/1975 | Skinner, II .................. 294/106 |
| 3,901,547 | 8/1975 | Skinner, II . |
| 3,927,424 | 12/1975 | Itoh . |
| 4,377,305 | 3/1983 | Horvath ...................... 294/106 |
| 4,834,443 | 5/1989 | Crowder et al. . |
| 4,980,626 | 12/1990 | Hess et al. .................. 294/106 |
| 4,984,951 | 1/1991 | Jameson ...................... 294/106 |
| 4,986,723 | 1/1991 | Maeda ........................ 901/36 |
| 5,080,681 | 1/1992 | Erb . |
| 5,108,140 | 4/1992 | Bartholet . |
| 5,200,679 | 4/1993 | Graham . |
| 5,280,981 | 1/1994 | Schulz ....................... 294/106 |
| 5,378,033 | 1/1995 | Guo et al. . |

OTHER PUBLICATIONS

Shimojima, H., Yamamoto, K. and Kawakita, K., "A study of Grippers With Multiple Degrees of Mobility", JSME International Journal, vol. 30, No. 621, pp. 515–522, 1987.

Crowder, R.M., "An Anthropomorphic Robotic End Effector", Journal of Robotics and Autonomous Systems, vol. 7, No. 4, pp. 253–268, Nov. 1991.

G. Guo, X. Qian and W.A. Gruver, "A Single–DOF Multi-Function Prosthetic Hand Mechanism with an Automatically Variable Speed Transmission", Proceedings of the ASME Mechanisms Conference, Phoenix, vol. DE–45, pp. 149–154, 1992.

M. Rakik, "Multifingered Robot Hand with Selfadaptability", Robotics and Computer–Integrated Manufacturing, vol. 5, No. 2–3, pp. 269–276, 1989.

*Primary Examiner*—Dean Kramer
*Attorney, Agent, or Firm*—Swabey Ogilvy Renault; James Anglehart

[57] ABSTRACT

This invention provides a finger with three phalanges and three degrees of freedom for a flexible and versatile mechanical gripper which uses only a limited number of actuators. The finger is robust, can provide large grasping forces and can perform power grasps as well as pinch grasps. The mechanism used in the finger has an additional mechanism maintaining the last phalanx orthogonal to the palm in order to allow the gripper to perform pinch grasps on objects of different sizes. For purposes of fine control, tactile sensors as well as potentiometers are included in the finger. The mechanical gripper designed using these fingers allows the stable grasping of a wide class of objects while specifying only two coordinates (the force or position for closing the whole finger and the orientation of the finger) for each of the fingers. The mechanical gripper has three fingers and three phalanges per finger. When performing a grasp, the fingers will progressively envelope the object to be grasped and eventually reach a static equilibrium. Underactuation between the fingers of the gripper is also possible.

18 Claims, 19 Drawing Sheets

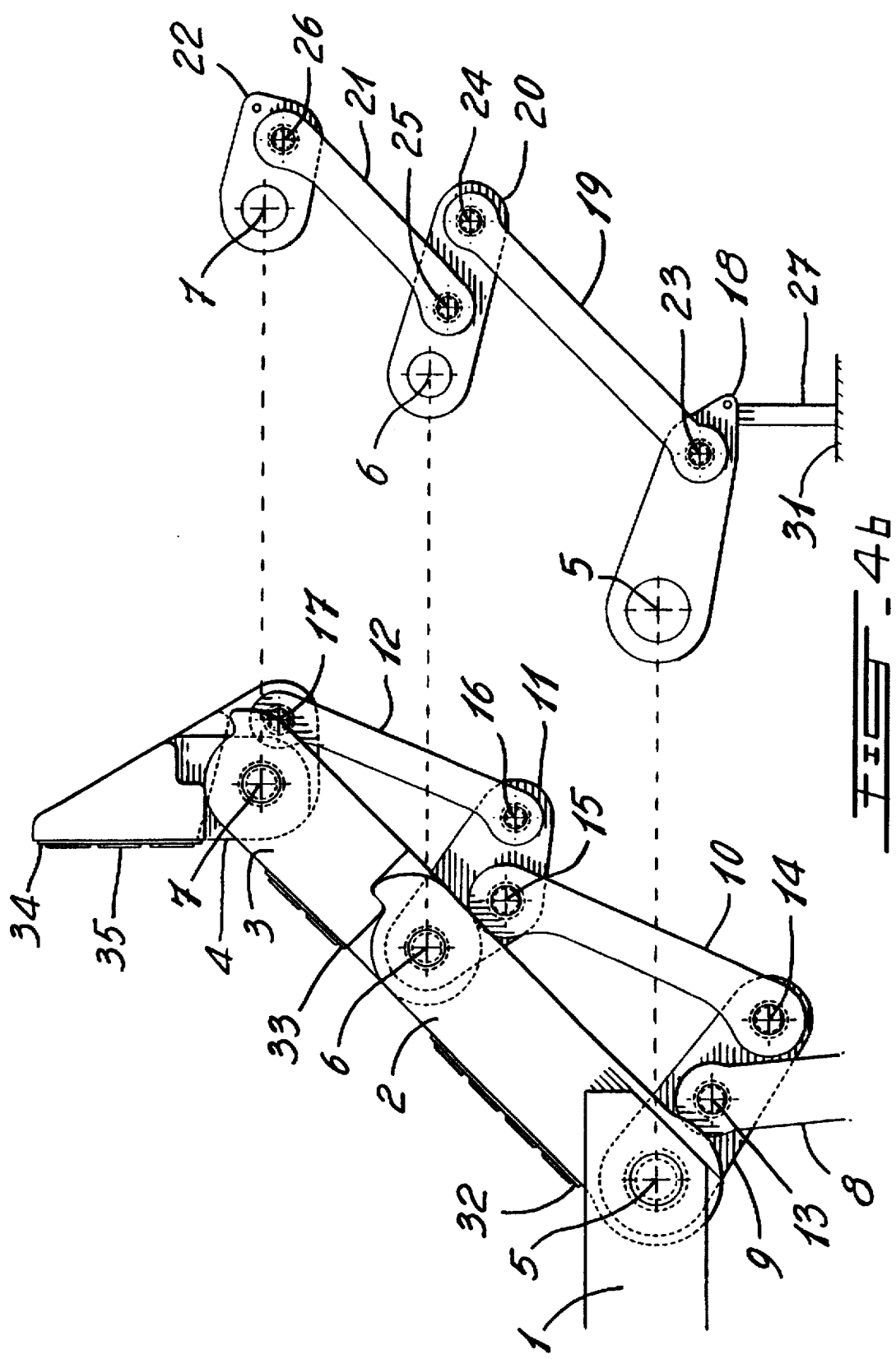

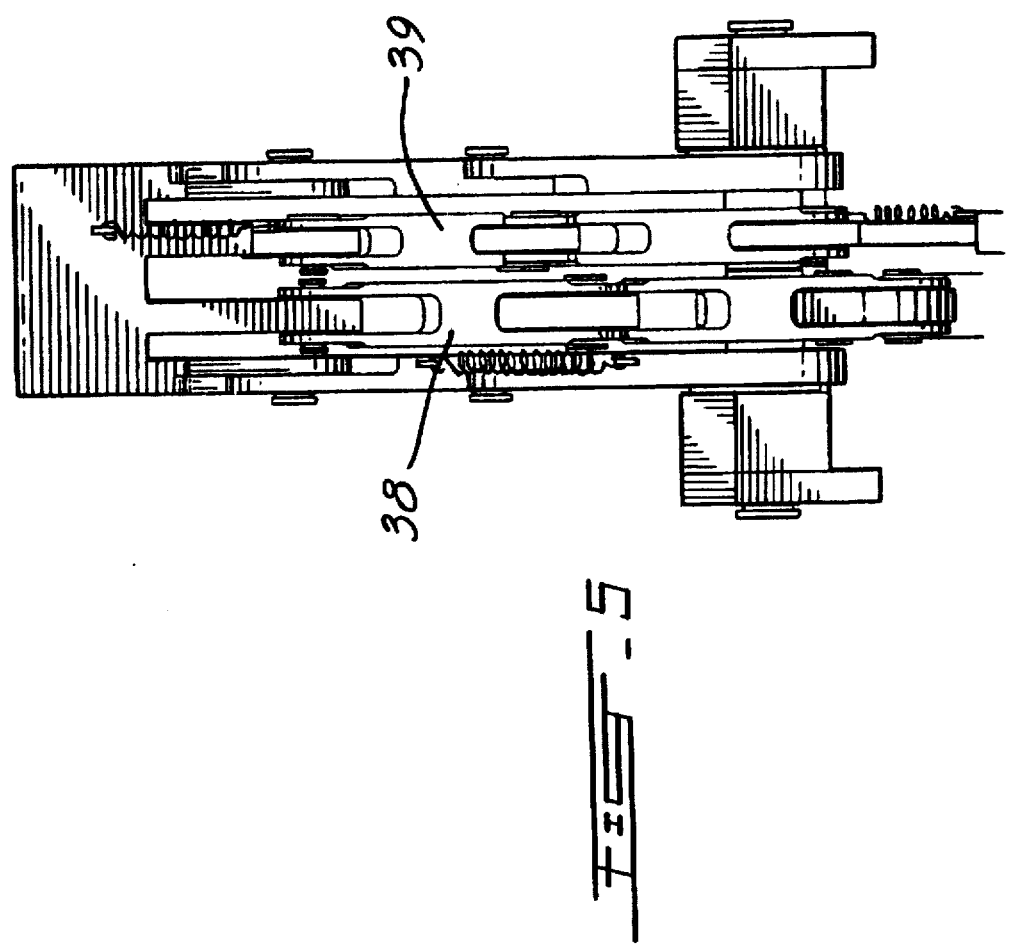

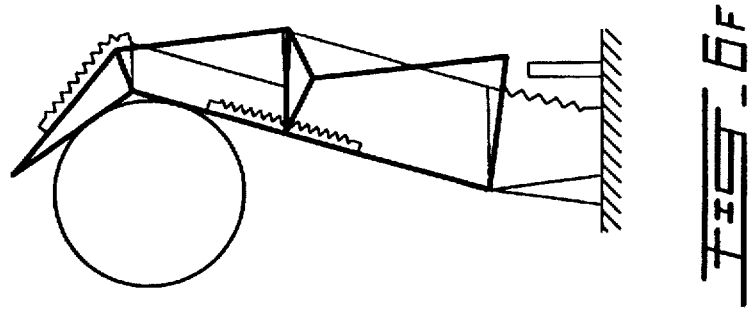
FIG_6f
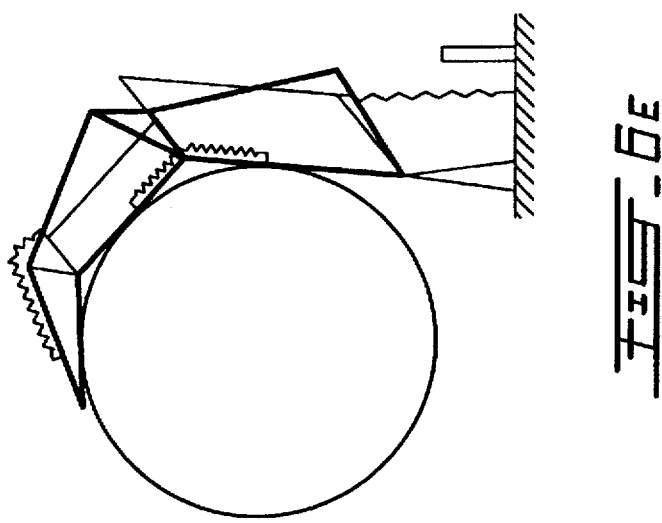
FIG_6e
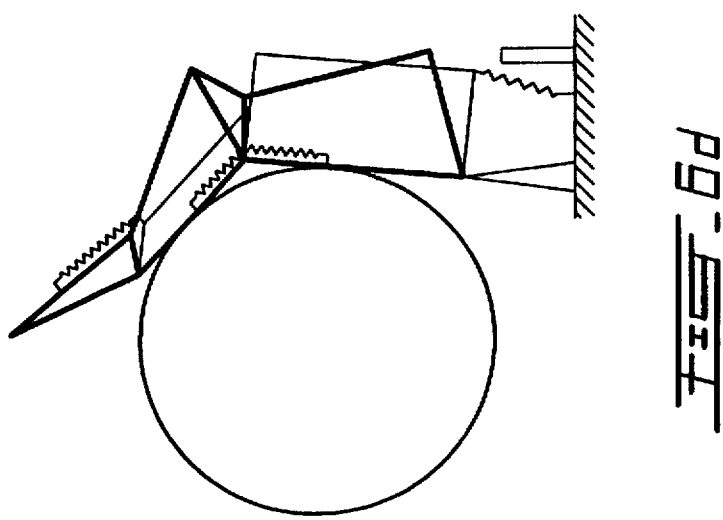
FIG_6d

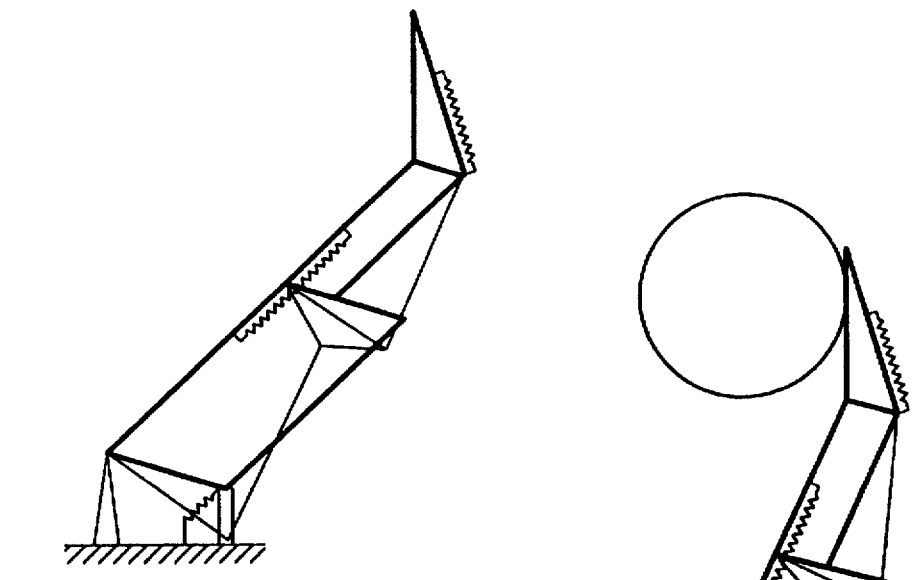
FIG_7a (FREE FINGER)
FIG_7b (PARALLEL PINCH GRASP)
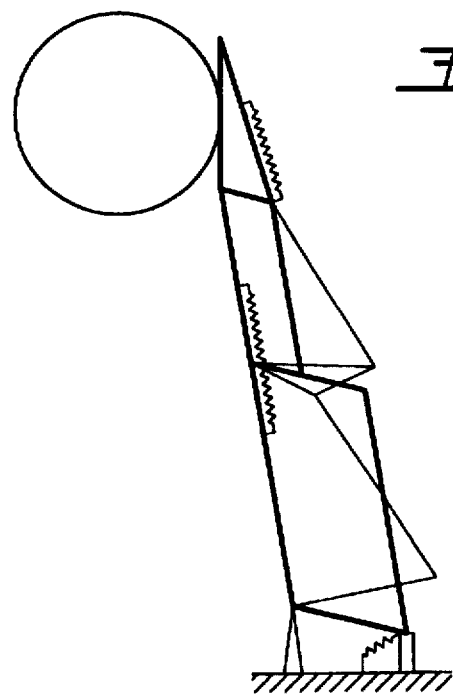
FIG_7c (PARALLEL PINCH GRASP)

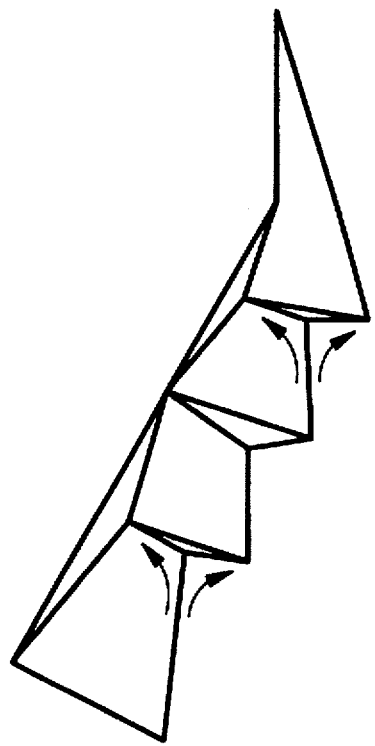
FIG. 8a (DOUBLE)
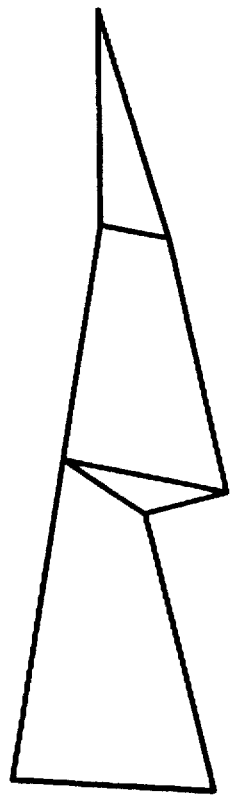
FIG. 8b (SINGLE)

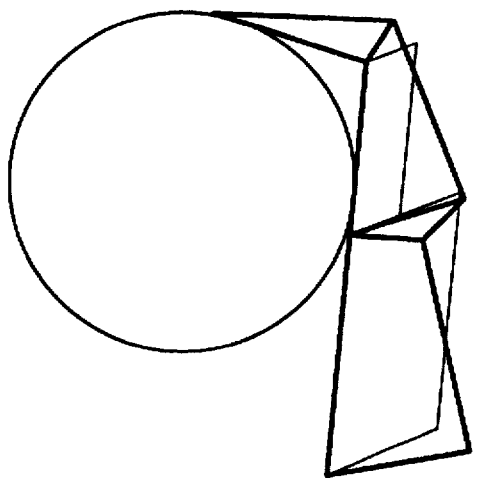
FIG_9a (INSTABILITY)
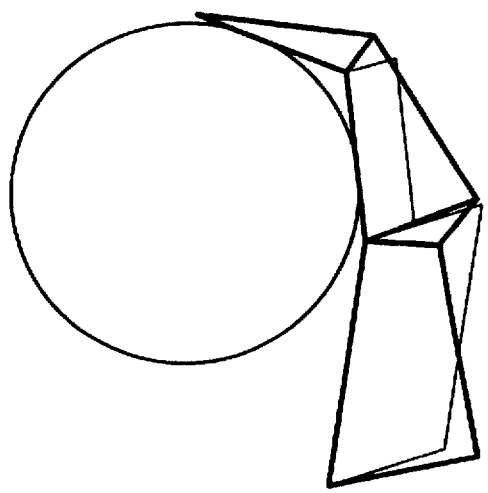
FIG_9b (EQUILIBRIUM)
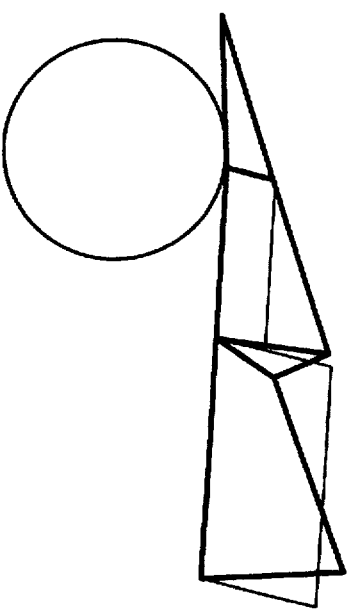
FIG_9c (INSTABILITY)
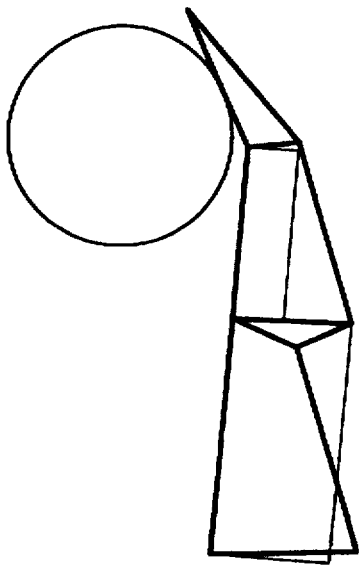
FIG_9d (EQUILIBRIUM)

FIG_14

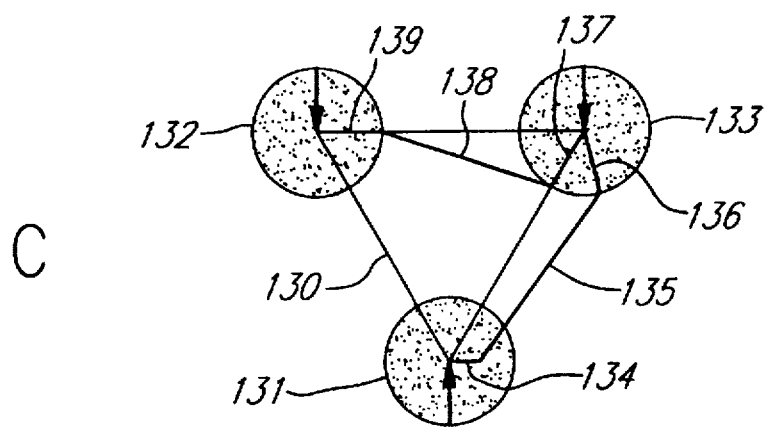
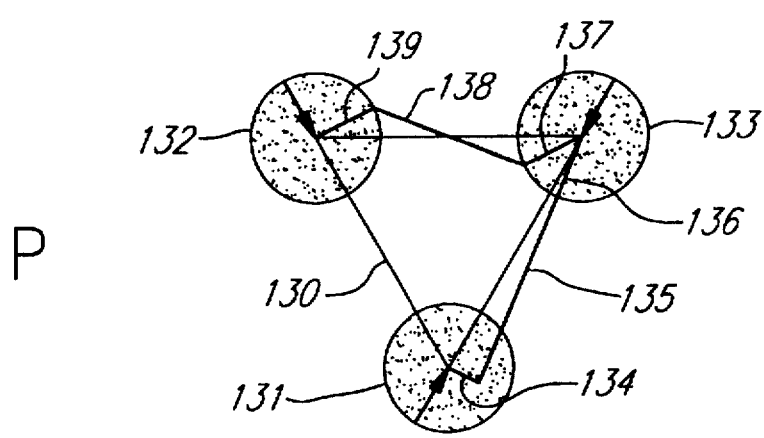
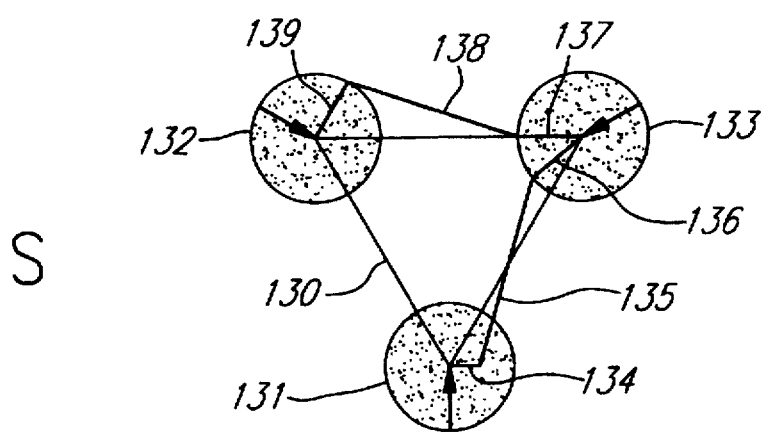
FIG. 17

UNDERACTUATED MECHANICAL FINGER WITH RETURN ACTUATION

FIELD OF THE INVENTION

The present invention relates to mechanical fingers used in mechanical grippers, and more specifically to underactuated mechanical fingers used in underactuated grippers, which are also referred to as underactuated hands or underactuated end effectors.

BACKGROUND OF THE INVENTION

Some mechanical grippers are designed for specific tasks. They are simple, robust, easy to manufacture and lead to simple control schemes. However, they are not flexible and a new gripper must be designed for each given task. These mechanical grippers have only few degrees of freedom and are widely used in industrial applications.

Other mechanical grippers are more flexible and can perform several different tasks. However, they are difficult to manufacture, lead to complex control schemes, include several actuators and can provide only small grasping forces. These mechanical grippers have several degrees of freedom.

Finally, other mechanical grippers have an architecture which combines the latter two cases, taking advantage of both through the concept of underactuation. Their design is based on a large number of degrees of freedom but with a reduced number of actuators. Indeed, underactuated grippers are defined as those which have more degrees of freedom than actuators. This leads to flexible grippers without the complexity associated with a large number of actuators. In general, one actuator is used for the closing motion of each of the fingers. The only detailed study of the application of this concept to a two-degree-of-freedom finger is presented in the scientific publication article by Shimojima, H., Yamamoto, K. and Kawawita, K., entitled "A Study of Grippers With Multiple Degrees of Mobility", published in JSME International Journal, Vol. 30, No. 261, pp. 515–522, 1987.

Underactuation can be achieved using tendons as is known from U.S. Pat. Nos. 3,694,021 to Mullen, 5,200,679 to Graham and 5,080,681 to Erb. The grasping forces provided by these grippers are limited and the tendons introduce friction and compliance. The fingers have three phalanges each.

Underactuation can also be achieved with mechanisms, which allows larger grasping forces. The existing fingers based on this principle have either two phalanges as disclosed by Itoh in U.S. Pat. No. 3,927,424, and by Shimojima, or the existing fingers have three phalanges as disclosed by Crowder in U.S. Pat. No. 4,834,443 and in his article, "An Anthropomorphic Robotic End Effector", published in the Journal of Robotics and Autonomous Systems, Vol. 7, No. 4, pp. 253–268, November 1991, and also in the Itoh patent. In the latter case, however, two of the phalanges are mechanically coupled, i.e., their relative motion is imposed by design. Hence, in all cases, the finger has only two degrees of freedom.

Underactuated hands cannot perform pinch grasps while maintaining the distal phalanges parallel to each other, for objects of different sizes. However, this feature is very useful and very often feasible with simple grippers. A mechanism which has been proposed in order to achieve this behavior with underactuated grippers is disclosed in U.S. Pat. No. 5,108,140 to Bartholet. However, this mechanism is applicable only to the second phalanx of a two-degree-of-freedom underactuated gripper.

In addition to the underactuation between the phalanges of a finger, it is also possible to obtain underactuation between the fingers of a same hand. This will further decrease the number of actuators while maintaining the same number of degrees of freedom. This principle has been disclosed for the actuation of many fingers, for example in U.S. Pat. No. 5,378,033 to Guo et al., and in the literature, see for example the article by G. Guo, X. Qian and W. A. Gruver, "A Single-DOF Multi-Function Prosthetic Hand Mechanism with an Automatically Variable Speed Transmission", published in the Proceedings of the ASME Mechanisms Conference, Phoenix, Vol. DE-45, pp. 149–154, 1992, and the article by M. Rakik, "Multifingered Robot Hand with Selfadaptability", published in Robotics and Computer-Integrated Manufacturing, Vol. 5, No. 2-3, pp. 269–276, 1989. In these references, each of the fingers has only one degree of freedom, i.e. the motion of the phalanges is coupled. The combination of the underactuation of the phalanges of a finger and the fingers of a hand has never been used before. For convenience, this principle is termed hyperunderactuation.

It is also possible to orient the fingers with respect to one another (i.e. motion about an axis perpendicular to the palm of the mechanical hand) with only one actuator by coupling their orientation. This is possible through the use of four-bar mechanisms that connect the base of the fingers. This decreases the number of degrees of actuation and freedom of the system. This type of coupling has already been presented in the literature and is provided by gears in U.S. Pat. No. 3,901,547 to Skinner,II and by grooves in Guo et al.

SUMMARY OF THE INVENTION

It is an object of the present invention to provide an underactuated finger with three phalanges and three degrees of freedom providing more stable, more flexible and more uniform grasps. This objective corresponds approximately to the behavior of the human finger performing a power grasp.

This invention provides a finger with three phalanges and three degrees of freedom for a flexible and versatile mechanical gripper which uses only a limited number of actuators. The finger is termed underactuated because it has more degrees of freedom than actuators. The finger is robust and can provide large grasping forces. The finger can perform power grasps as well as pinch grasps.

A mechanical gripper having orientable fingers designed using the fingers according to the invention makes stable grasping of a wide class of objects possible while specifying only two coordinates (the force or position for closing the whole finger and the orientation of the finger) for each of the fingers. More precisely, the mechanical gripper has three fingers and three phalanges per finger; each of the fingers can be rotated by a secondary actuator to obtain different configurations adapted to the object to be grasped.

The topology of the finger mechanism allows power grasps and closing of the finger to be performed with only one main actuator.

According to the invention, there is provided a mechanical finger comprising: mounting means for mounting the finger to a mechanical palm of a gripping mechanism, the palm having a palm plane; a first phalanx pivotally connected at a proximal end by the mounting means to the palm; a second phalanx pivotally connected at a proximal end to a distal end of the first phalanx; a third phalanx pivotally connected at a proximal end to a distal end of the second phalanx, the first, second and third phalanges pivoting about parallel pivot axes. The finger further comprises a differential driving actuation means connected to the first, second and third phalanges and a controllable actuator mounted to the palm, the actuation means either causing the first phalanx to pivot or the second phalanx to pivot depending on load on the first phalanx, and either causing the second phalanx to pivot or the third phalanx to pivot depending on load on the second phalanx, the first phalanx being preferentially pivoted by the differential actuator means before the second phalanx in absence of load on the first phalanx, and the second phalanx being preferentially pivoted by the differential actuator means before the third phalanx in absence of load on the second phalanx. The also is provided with a return actuation means connected to the palm and the first, second and third phalanges for maintaining a contact surface of the third phalanx substantially orthogonal to the palm plane during movement of the controllable actuator when the first and second phalanges are under no load. Thus, a mechanism maintains the last phalanx orthogonal to the palm (when it is relevant) in order to allow the mechanical hand to perform pinch grasps on objects of different sizes. When performing a grasp, the finger will progressively envelope the object to be grasped and eventually reach a static equilibrium.

Preferably, the driving actuation means comprises first and second drive links pivotally connected at a radially inner end to the first and second phalanges respectively to pivot about the pivot axes thereof, a first drive coupling link pivotally connected at one end to the first drive link and at an opposite end to the second drive link, and a second drive coupling link pivotally connected at one end to the second drive link and at an opposite end to the third phalanx. The first drive link may then be connected to the controllable actuator, such that the drive actuation means requires only four pivotally connected links to drive the phalanges. Also preferably, the return actuation means comprises first and second return links pivotally connected at a radially inner end to the first and second phalanges respectively to pivot about the pivot axes thereof, a first return coupling link pivotally connected at one end to the first return link and at an opposite end to the second return link, a second return coupling link pivotally connected at one end to the second return link and at an opposite end to a return distal abutment link, a palm abutment mounted to the palm, first biasing means for biasing the first return link against the palm abutment, and second biasing means for biasing the third phalanx against the return distal abutment link. In this way, the return actuation means requires only five pivotally connected links to maintain the third phalanx orthogonal to the palm.

For purposes of fine control, tactile sensors as well as potentiometers are included in the finger. The potentiometers allow the determination of the exact configuration of the finger (which cannot be determined with the sole knowledge of the actuator coordinate because of the underactuation). The tactile sensors allow the determination of the contact points on the phalanges and the computation of the contact forces.

Moreover, in a second embodiment, underactuation between the fingers in a mechanical gripper including a plurality (typically three) is obtained. A differential mechanism allows the force of the actuator to be distributed between the fingers. If a finger grasps an object, the actuator will continue its motion and the other fingers will continue to close with the help of the differential system. This principle will be explained for a 2D case with two fingers. However, it can be generalized for the 3D case with three fingers. In the latter embodiment, four-bar mechanisms are also used for the orientation of the fingers.

It is a further object of the invention to combine hyper-underactuation and the coupling of the rotation of the fingers to obtain a mechanical hand with three fingers and three phalanges per finger which has ten degrees of freedom and only two degrees of actuation.

BRIEF DESCRIPTION OF THE DRAWINGS

The present invention will be better understood by way of the following description of a preferred embodiment of the invention with reference to the appended drawings in which:

FIG. 4a is a simplified side view of the underactuated finger, and FIG. 4b is an exploded view of FIG. 4a;

FIG. 5 is a simplified rear view of the underactuated finger;

FIGS. 6a through 6f illustrate the principle of power grasps using underactuation;

FIGS. 7a through 7c illustrates the principle of the parallel pinch grasp;

FIGS. 8a and 8b show the double and single mechanisms;

FIGS. 9a through 9d illustrates the principle of equilibrium points;

FIG. 17 is an illustration of a four-bar mechanisms for the coupling of the orientation of the three fingers in a 3D version of the second embodiment in which the arrows indicate the orientation of a grasping face of each of the fingers.

DETAILED DESCRIPTION OF THE PREFERRED EMBODIMENT

General Description of the Mechanical Finger and Gripper

Figure 1:
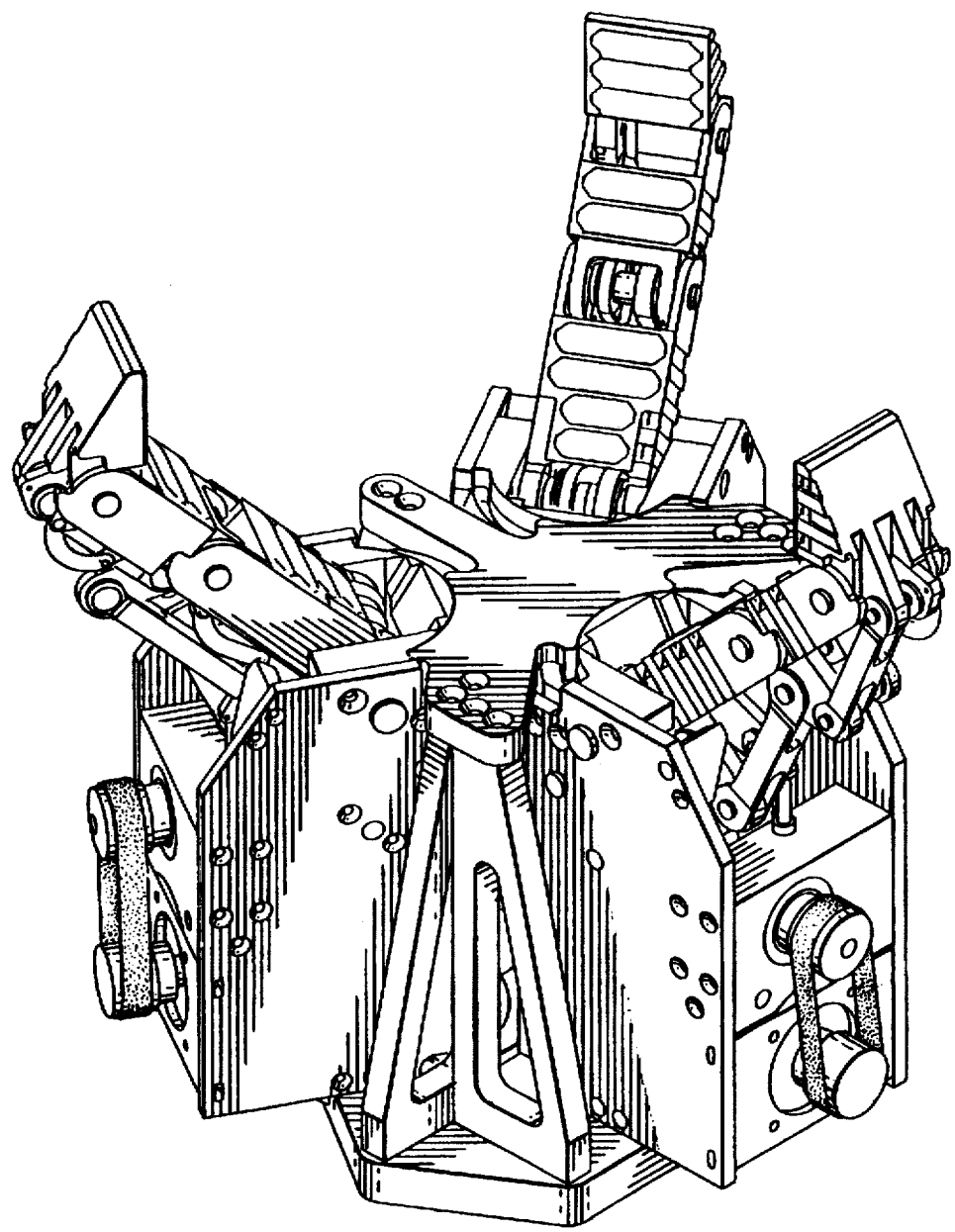
FIG. 1 shows a complete mechanical gripper provided with the underactuated fingers according to the preferred embodiment.

This patent is primarily devoted to the description of the mechanisms and principles of underactuation of each of the fingers. However, in order to clearly present the context of the invention, the entire gripper is first briefly described (see FIG. 1).

The gripper is composed of three fingers, each of the fingers being supported by an actuation module. These modules are supported by the base of the hand. The fingers are geometrically located on the vertices of an equilateral triangle. This arrangement allows a uniform and symmetric grasp of spherical or cylindrical objects. Moreover, this geometry optimizes the space available for each of the actuation modules.

Figure 2:
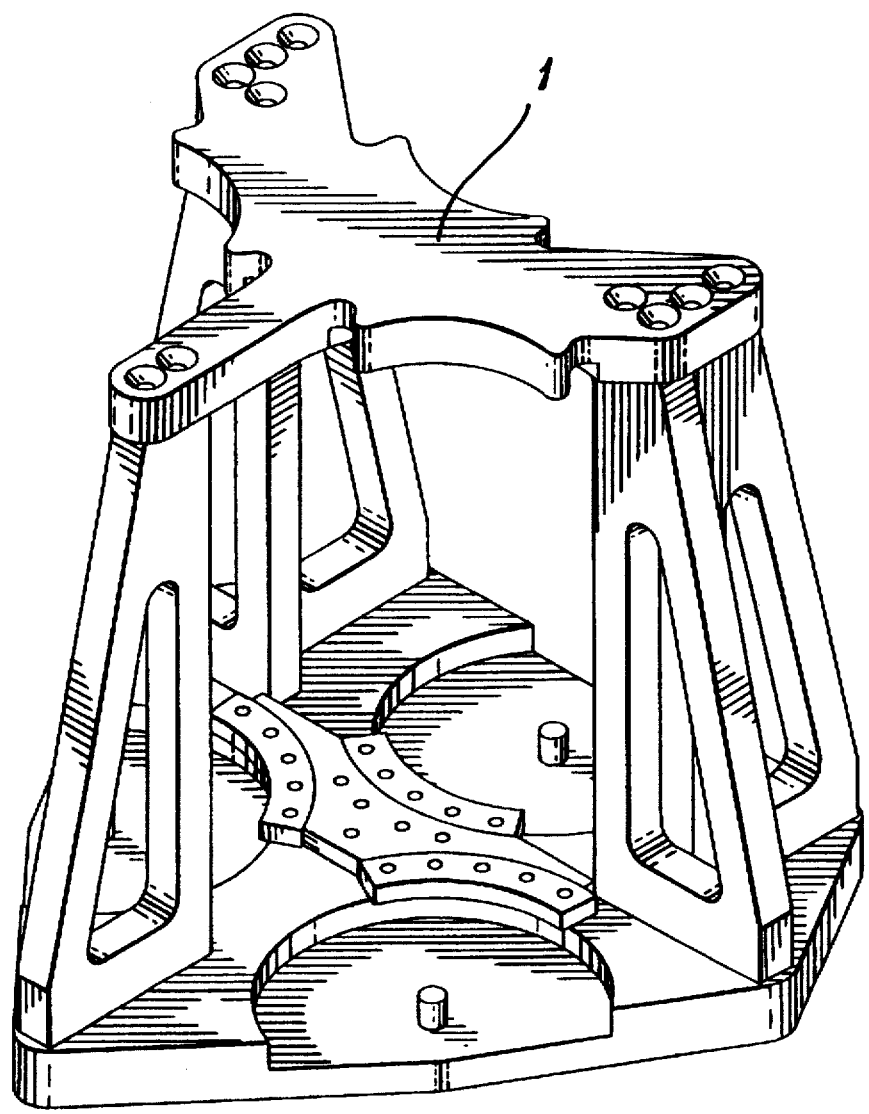
FIG. 2 shows the base of the hand including the palm on which the three finger modules are to be mounted.

The base of the hand is composed of two plates connected by five triangular links which are arranged in order to obtain a high stiffness. The upper plate 1 constitutes the palm of the hand (see FIG. 2).

Figure 3:
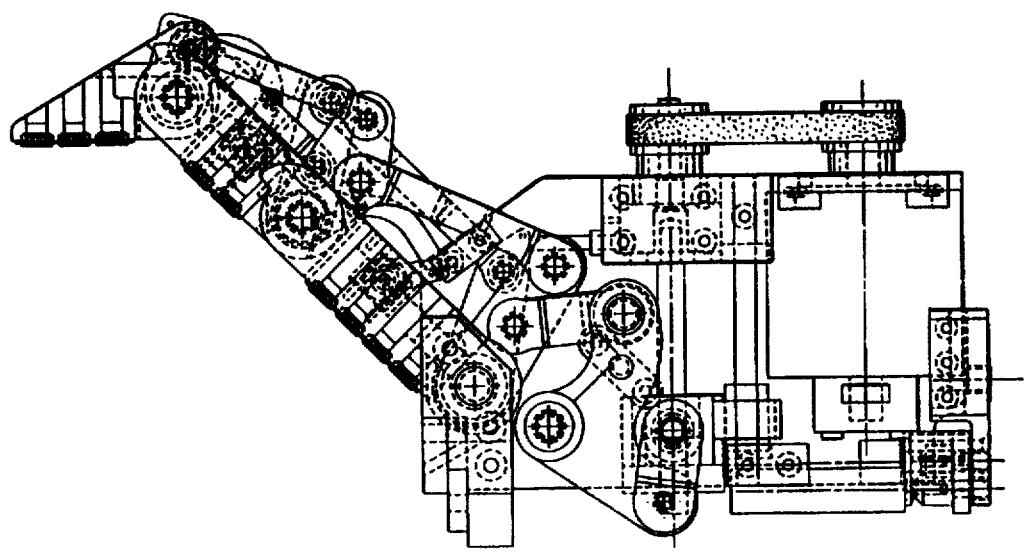
FIG. 3 is a complete side view of the finger and its actuation module according to the preferred embodiment.

Each of the fingers has four degrees of freedom and two actuators. Three degrees of freedom are associated with the closing of the finger and are controlled using the main actuator. These three degrees of freedom constitute the underactuated part of the finger (see FIG. 3). The fourth degree of freedom of each of the fingers allows the rotation of the finger with respect to an axis orthogonal to the plane of the palm.

The finger is composed of two layers of mechanisms. The first layer 38 is the drive layer used for the actuation itself while the second layer 39 is the return layer used to maintain the third phalanx orthogonal to the palm in a pinch grasp (see FIG. 5).

The closing and grasping motion is controlled by an electrical actuator (main actuator) which is coupled to the finger through a timing belt and a ball screw. This coupling allows large grasping forces. A mechanism is used to transform the linear motion of the ball screw into a rotation of the driving link of the finger which is attached to the base of the finger (see FIG. 3).

Rotation of the Fingers with Respect to an Axis Orthogonal to the Palm

The fourth degree of freedom of each of the fingers allows the rotation of the finger with respect to an axis orthogonal to the plane of the palm. This motion is used to generate the relative configurations of the fingers which are necessary in order to perform common grasps such as cylindrical, spherical and pinch grasps (see FIGS. 10 to 12). The fourth degree of freedom is controlled using a secondary actuator. The vertical axis of rotation of the finger is supported in two points. The lower support consists of a pin in a hole while the upper support is a circular arc composed of male and female parts. This arc is necessary since the horizontal axis of rotation of the first phalanx physically intersects the vertical axis of rotation. The circular arc joint is not back-drivable because of the friction involved, if a pure torque is not applied to the finger. This property is useful since it allows the secondary actuator to move the finger with reduced forces when no object is being grasped (free motion). Indeed, this actuator does not play a significant role in the grasping of objects. It is simply used to orient the fingers before realizing a grasp and hence, the secondary actuator can be small. The secondary actuator controls the orientation of the finger through a gear which is coupled to the actuator and to a semi-circular rack mounted on the base of the hand (see FIGS. 2 and 3).

Sensors

In the preferred embodiment, the fingers are equipped with several sensors. Since the finger has four degrees of freedom and only two actuators, it is not possible to determine the configuration of the finger using only the coordinates of the actuators. In order to compensate for this lack of information, two potentiometers are mounted on the joints of the second and third phalanx. These sensors are coupled to the joints by four-bar linkages because of space limitation at the joints (see FIG. 3).

In order to determine the position of the contact points (and the force at the contact points) between the finger and the object in a grasp, tactile sensors are mounted on the front face of the phalanges. These sensors are robust. They are located behind a metal plate which is designed to protect them from excessive forces or localized high pressure, while allowing them to sense the loads on the phalanges (see FIGS. 1 and 3).

These sensors allow the determination of the configuration of the fingers as well as the computation of the location and magnitude of the normal forces applied on the object.

The Underactuated Finger

Figure 4B:
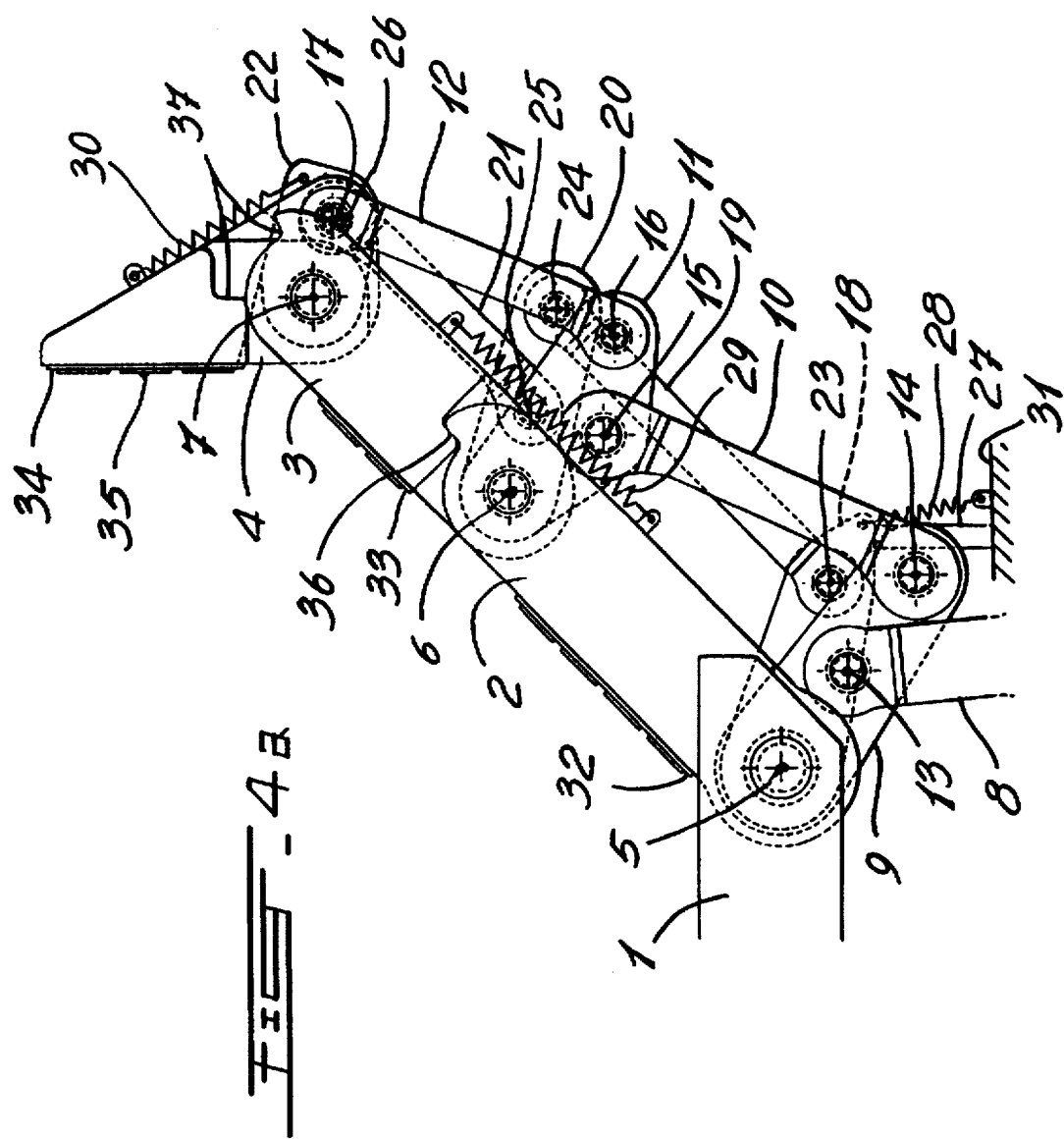
Figure 6C:
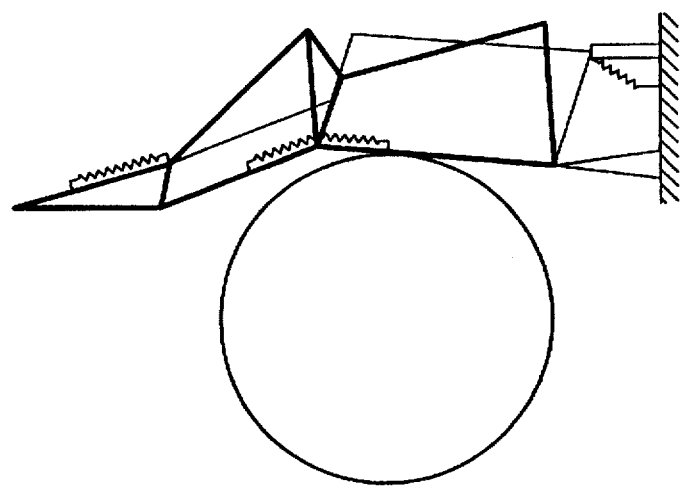
Figure 6B:
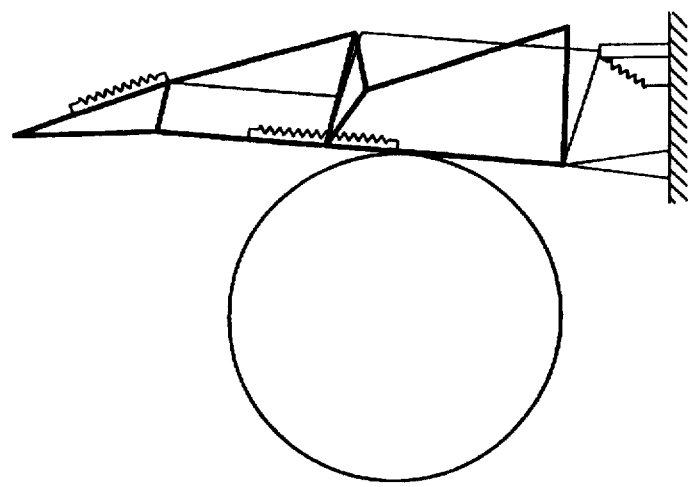
Figure 6A:
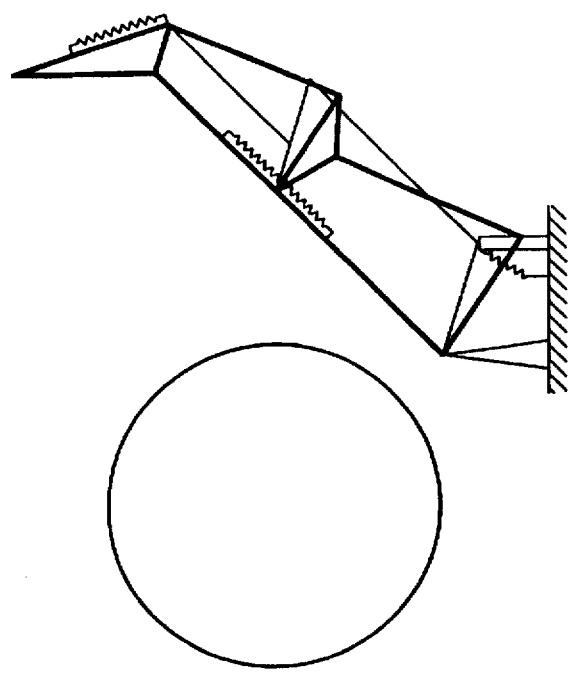

The principle of the underactuated finger will now be described with reference to FIGS. 4a, 4b and 5. The finger is composed of three phalanges. The first proximal phalanx 2 is connected to the base of the finger 1 through the proximal revolute joint 5 (part of the mounting to the palm). The second median phalanx 3 is connected to the proximal phalanx 2 through the median revolute joint 6. The third distal phalanx 4 is connected to the median phalanx 3 through the distal revolute joint 7.

Having three phalanges (and three degrees of freedom) instead of two leads to more flexibility and allows objects having a wider variety of shapes and sizes to be grasped. Moreover, it leads to a more uniform distribution of the forces among the phalanges and to a better grasping stability because of a better adaptation to the shape of the objects.

Mechanical stoppers 36 and 37, which are machined directly on the frame of the phalanges prevent the excessive hyperextension of the finger. Mechanical stopper 36 blocks joint 6 so that phalanges 2 and 3 are in line when the finger is in full extension. Mechanical stopper 37 blocks joint 7 so that the distal phalanx 4 can be in a maximum hyperextension state making an angle of 20 degrees with respect to phalanx 3. This allows a parallel pinch grasp to be performed with the distal phalanx 4 even when the first and second phalanges are rotated forward from their vertical orientation (see FIG. 7c). Mechanical stoppers prevent the excessive hyperextension of the finger, which might lead to an improper behavior of the finger or to mechanical failures. The phalanges are also machined to prevent excessive flexion of the fingers which could also lead to mechanical failures.

In order to ensure the grasping of objects of different shapes and sizes, springs 28, 29 and 30 are used to keep the finger in extension when no object is in contact with the phalanges. Spring 29 tends to maintain the median joint 6 in extension. Springs 28 and 30, which are working in series, tend to maintain the distal joint 7 in extension. It is pointed out that the actuator has to overcome the force of the springs, which tend to maintain the extension of the finger. The springs must therefore be compliant enough to avoid the expulsion of the object during the grasp and they must also be stiff enough to maintain the extension of the finger when no object is in contact with the phalanges. Additionally, the relative stiffness of the springs must be selected in order to obtain the desired closing sequence of the fingers. In the present case, the effective stiffness of spring 29 must be smaller than the effective stiffness of springs 28 and 30.

The motion is transmitted to the finger by the main actuator coupler link 8 to the first proximal driving link 9. The proximal drive or driving link 9 then transmits the force to the first proximal coupler link 10. The proximal coupler link 10 transmits the force to the second median drive or driving link 11. The median driving link 11 then transmits the forces to the proximal and median phalanges 2 and 3 and to the second median coupler link 12. The median coupler link 12 transmits the forces to the distal phalanx 4. The distal phalanx 4, partially transmits the forces to the median phalanx 3. This completes the description of the actuation drive layer 38.

The dimensions of the links, the configuration of the fingers and the position of the contact points will determine the distribution of the forces between the phalanges. With appropriate link lengths, the finger will envelope the object while exerting well distributed grasping forces which will tend to push the object towards the palm and opposing fingers.

An example of grasping is depicted in FIGS. 6a to 6e in order to illustrate the principle of underactuation, which allows enveloping grasps to be performed by the finger. In the initial configuration, the finger is free from external contacts. The finger will first contact the object to be grasped on the proximal phalanx 2. Since the motion of the proximal phalanx 2 is then inhibited by the object, the median phalanx 3 will then rotate with respect to the median joint 6 and move towards the object, until contact is reached. Since the motion of the first two phalanges is then inhibited, the third phalanx 4 will rotate around the distal joint 7 and move towards the object until contact is reached. The three degrees of freedom of the finger are now constrained and the object is fully grasped. Grasping forces can be increased in that configuration.

The first contact with the object can also occur on the median phalanx 3. The median joint 6 will then remain in extension and the rest of the sequence is similar to what has been described above (see FIG. 6f).

Finally, the first contact with the object can also occur on the distal phalanx 4. In this case, only the distal phalanx 4 will be used to grasp the object (see FIGS. 7a through 7c).

Parallel Pinch Grasp Mechanism

When contact between the finger and the object occurs only on the distal phalanx 4, it is important to maintain the distal phalanges of opposing fingers parallel to one another in order to ensure a more stable grasp. Indeed, it can be seen that an angle between the fingers would tend to push the object away from the grasp.

The parallel return mechanism is composed of two parallelogram four-bar linkages which maintain the third distal phalanx 4 orthogonal to the palm of the hand 1 in the case of a pinch grasp. Mechanical stoppers and springs allow the distal phalanx to close when an enveloping grasp is performed. The mechanism can be described in detail as follows. The first return link 18 is connected to the finger through the proximal revolute joint 5 and is lying on a mechanical stopper 27 which is mounted on the base of the finger or hand 31. The palm 1 and the base of the finger 31 are rigidly coupled. The first return coupler link 19 connects the link 18 to the second median return link 20. Together with the proximal phalanx 2, these links define a parallelogram four-bar linkage. The median phalanx 3, the median parallel link 20, the parallel distal link 22 and the parallel return second median coupler link 21 define the second parallelogram four-bar mechanism. The return parallel distal abutment link 22 is lying on a mechanical stopper attached to the distal phalanx 4. Springs are used to constrain the links which are lying on mechanical stoppers in order to ensure contact at the stoppers when no object is present.

When no object is contacted or when a parallel pinch grasp is being performed, the distal phalanx is maintained orthogonal to the palm of the hand by the parallelogram four-bar linkages, which remain in contact with the mechanical stoppers. This is illustrated in FIGS. 7a, 7b and 7c.

If an enveloping grasp is performed, the parallelogram four-bar linkages will be taken away from the mechanical stoppers thereby allowing the desired enveloping motion. The parallelogram four-bar linkages do not affect the underactuated enveloping grasps (see FIG. 6e).

It is pointed out that only one mechanical stopper could have been used for the parallel pinch grasp mechanism. However, a second stopper has been introduced because of the wide range of motion of the finger which made it difficult to design a single stopper.

Finally, it is also pointed out that the parallel pinch grasp mechanism could be located at the median phalanges instead of at the distal phalanges. Mechanical stoppers designed to prevent the distal phalanges to move away from the grasp would allow parallel pinch grasps to be performed with both the median and distal phalanges. This could improve stability in some cases. However, the maximum opening of the hand is considerably reduced. The distal phalanges could be closed on the object when performing a parallel pinch grasp with the median phalanges. The mechanism required to obtain this motion is a proximal parallelogram four-bar linkage added to the actuation mechanism. This mechanism would be lying on a mechanical stopper located on the median phalanx.

Simplified vs. Complex Mechanism

The mechanism originally used at each of the phalanges consisted of a cascade of two four-bar linkages. The intermediate link clearly shows the distribution of the forces between the current phalanx and the next phalanx, as illustrated in FIG. 8a. After studying several mechanisms, it has been found that the appropriate behavior could also be obtained with only one four-bar linkage. A close connection has been established between the link lengths of both systems which will lead to similar results. The advantage of the simplified mechanism introduced here is that it reduces the number of links and joints, thereby reducing friction, leaving more space for sensors (e.g. potentiometers) and reducing the complexity of the computations involved in the determination of the joint angles and forces. However, the total volume of the mechanism is slightly larger due to the possible mechanical interferences.

Equilibrium Points

Equilibrium contact points can be defined on the second and on the third phalanges. These points are defined as follows. When a force is applied on a phalanx at a point further away from the base than the equilibrium point, then the phalanx will tend to extend the finger. In this case, the motion of the finger will stop when mechanical stoppers are reached (full extension) or when a parallel pinch grasp is stabilized. On the other hand, when a force is applied on a phalanx at a point closer to the base than the equilibrium point, the phalanx will tend to close the finger on the object.

Generally, when performing a grasp with no contact at the proximal phalanx, the contact point will move away from the base until it reaches the equilibrium point and the finger will be stabilized in this configuration. An example is given in FIGS. 9a and 9b for the median phalanx and in FIGS. 9c and 9d for the distal phalanx. It is pointed out that the equilibrium point changes with the configuration of the finger. Moreover, if the equilibrium point on the last phalanx is located further away from the base than the end of the physical phalanx, it is possible that some objects will be expulsed instead of being grasped.

Examples of Grasps

Figure 10A:
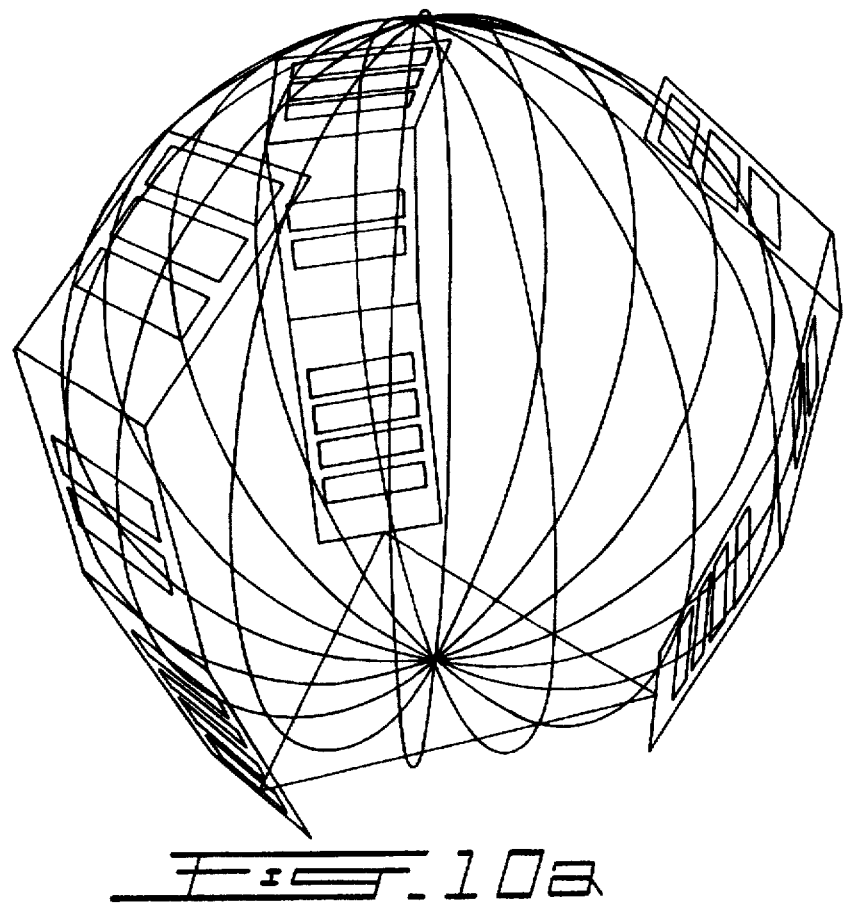
FIGS. 10a and 10b show examples of spherical grasps (obtained by simulation)
Figure 10B:
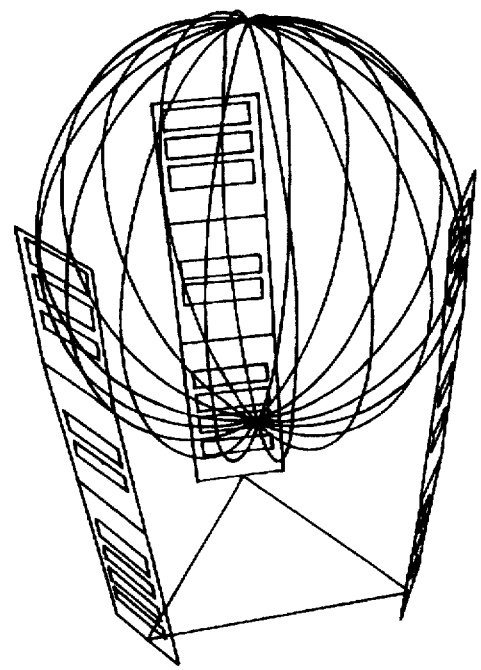
Figure 11A:
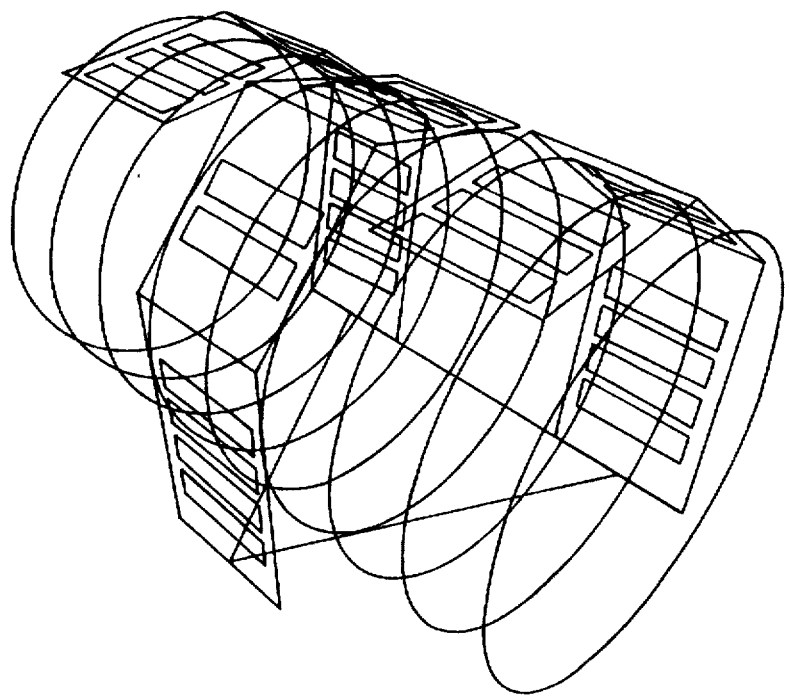
FIGS. 11a and 11b show examples of cylindrical power grasps (obtained by simulation)
Figure 11B:
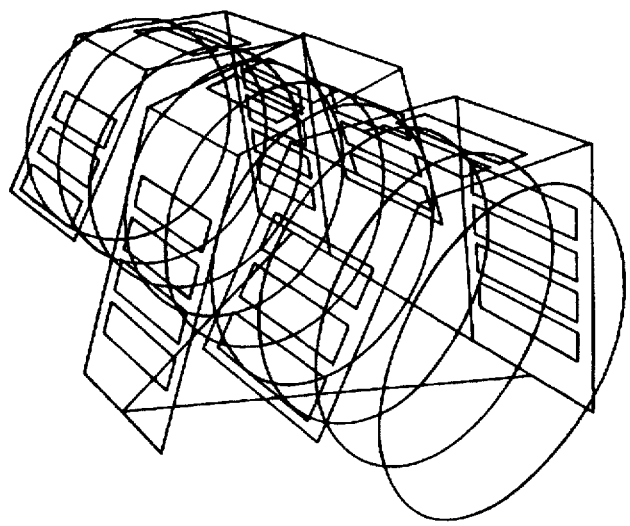
Figure 12A:
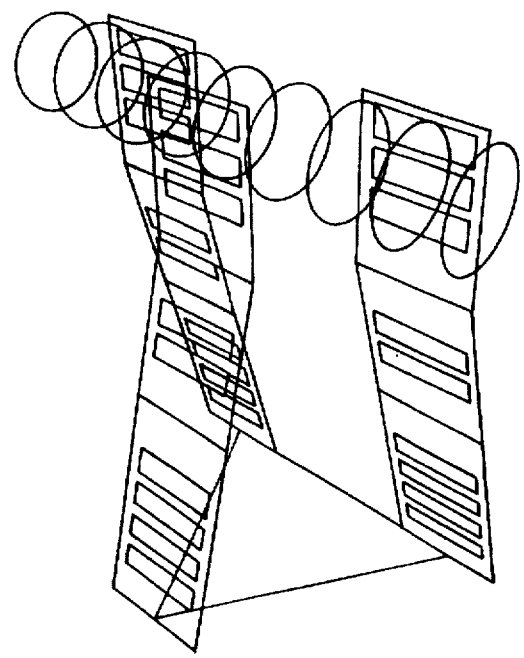
FIGS. 12a and 12b show examples of parallel pinch grasps (obtained by simulation)
Figure 12B:
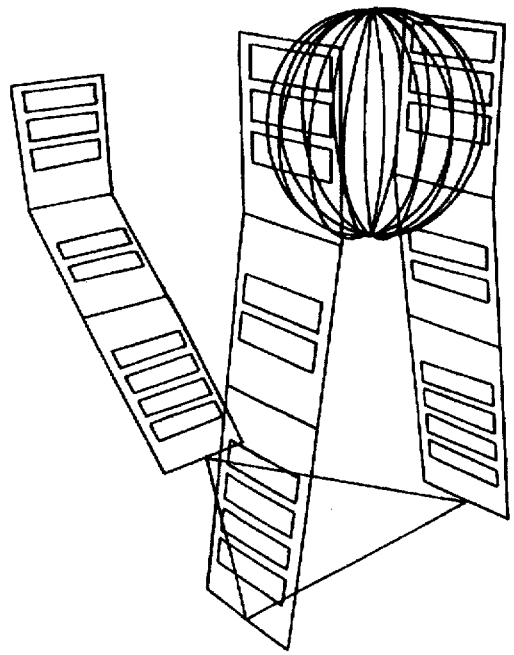

Examples illustrating the wide variety of possible grasps are given in FIGS. 10 to 12.

Underactuation Between Fingers of the Same Hand

In a second embodiment of the invention, the underactuation is extended to the relative motion of three fingers of the same hand, thereby providing a hyperunderactuated hand. This allows a reduction in the number of actuators and leads to a simpler design. The application of this concept to a 2D system will now be described. However, it is easily generalized to a 3D system with 3 fingers.

Figure 13:
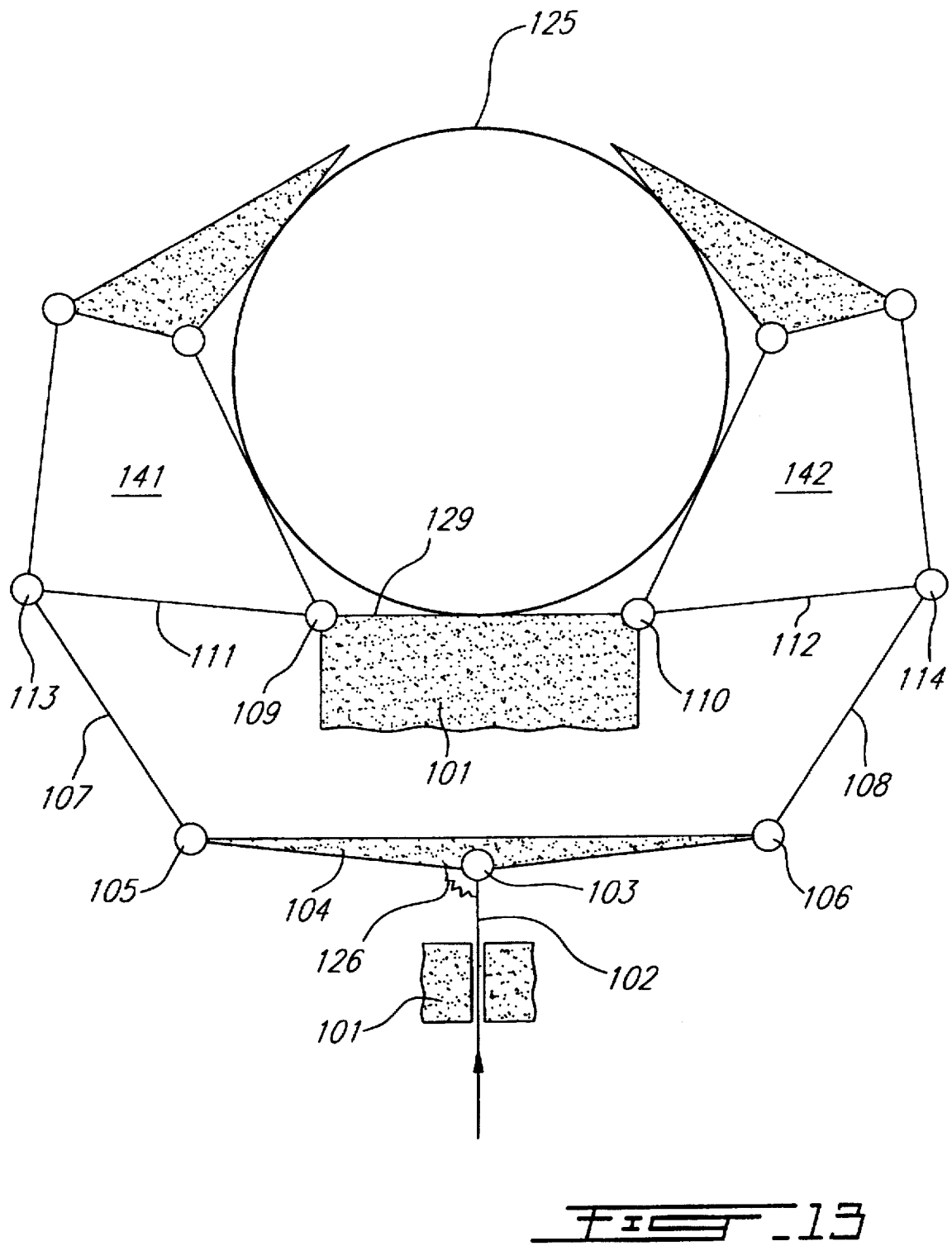
FIG. 13 shows a grasp of a symmetrical object with two fingers in the second embodiment.

Referring to FIG. 13, the mechanism allowing the underactuation between the fingers is mainly composed of the differential lever 104 which is attached to the actuating bar 102 by the joint 103. The actuating bar 102 is linked to the frame of the hand 101 by a prismatic joint oriented orthogonally to the surface of the palm 129. The palm is the top of the frame of the hand 101. The bar 104 which can rotate around the joint 103 transmits the power of the actuator to the bars 107 and 108 by the joints 105 and 106. The bars 107 and 108 then transmit the power to the two fingers 141 and 142 by the joints 113 and 114. A spring 126 determines the orientation of the differential lever when the hand is in a free configuration. The movement of the actuating bar 102 will make the fingers 141 and 142 grasp the object 125.

Figure 14:
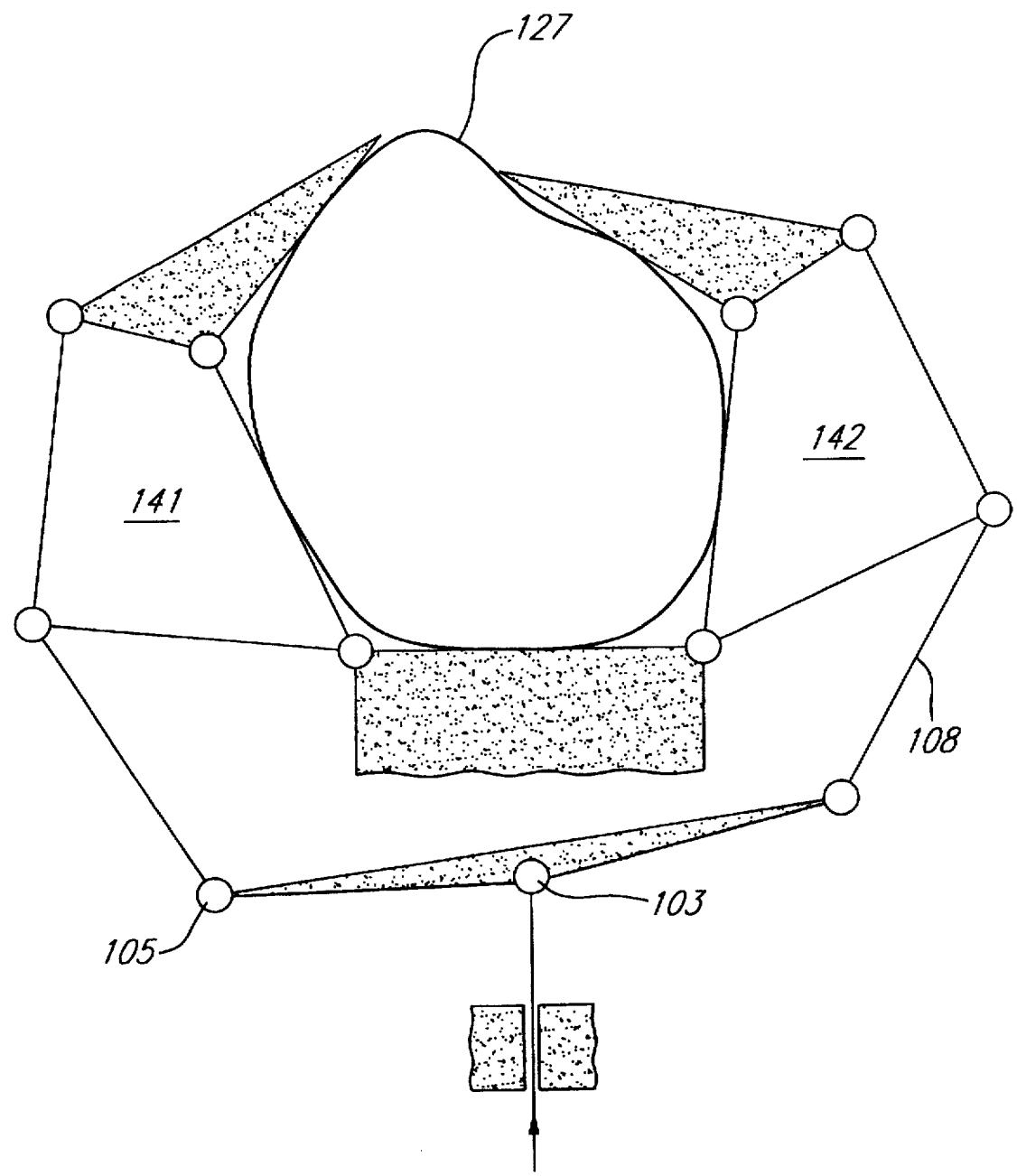
FIG. 14 shows a grasp of a non-symmetrical object with two fingers in the second embodiment.

Referring to FIG. 14, during the closing of the hand on a non-symmetric object 127, the finger 141 will first grasp the object. The differential lever will then stop at joint 105 and pivot around this axis since it is free to rotate around the axis of joint 103. The actuation will then continue through the bar 108 and the finger 142 will close on the object until the grasp is completed. The hand will then match the shape of the object.

Figure 15:
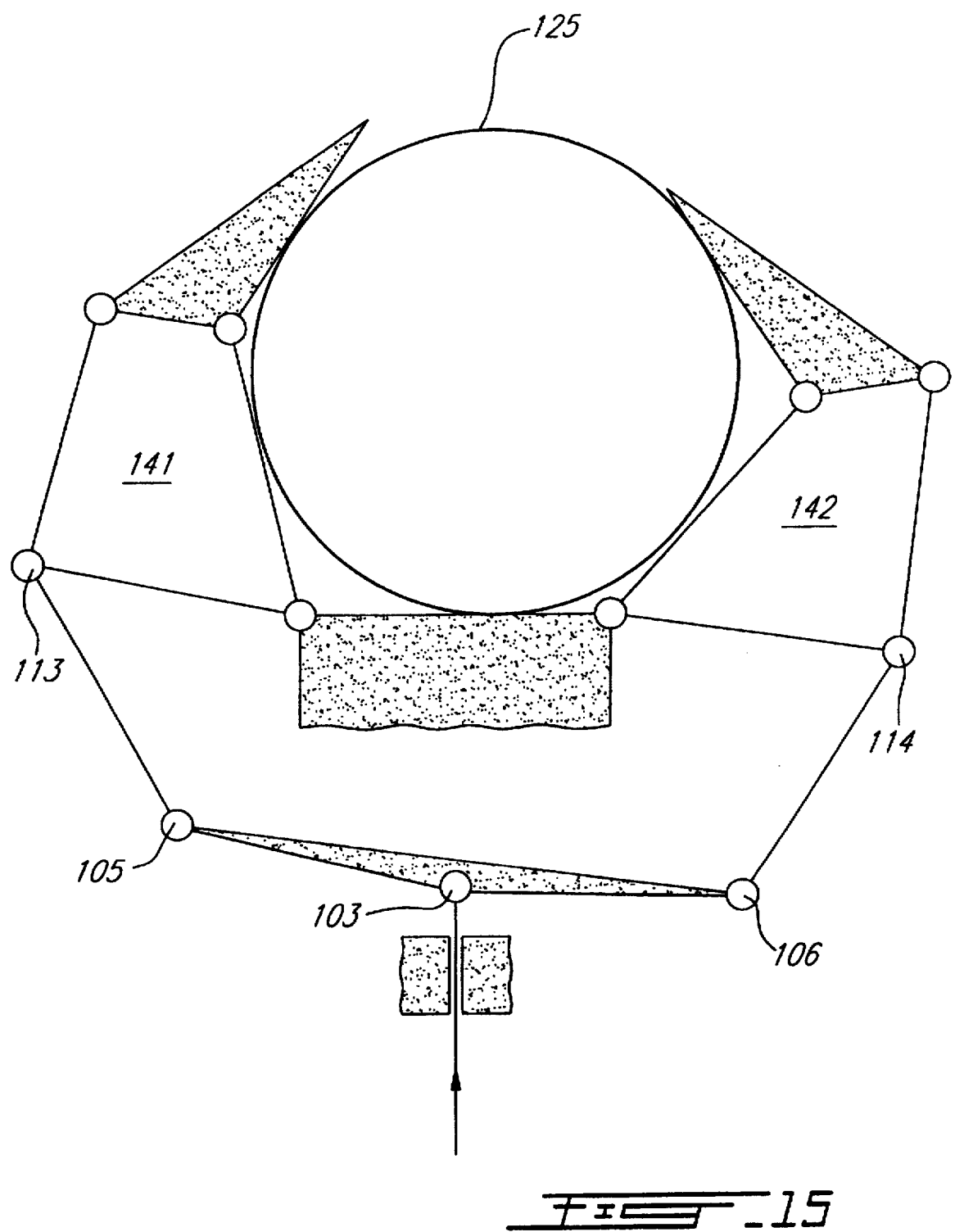
FIG. 15 shows an object displaced away from the center of the palm of the hand and the resulting effect on the underactuation mechanism, for the second embodiment.
Figure 16:
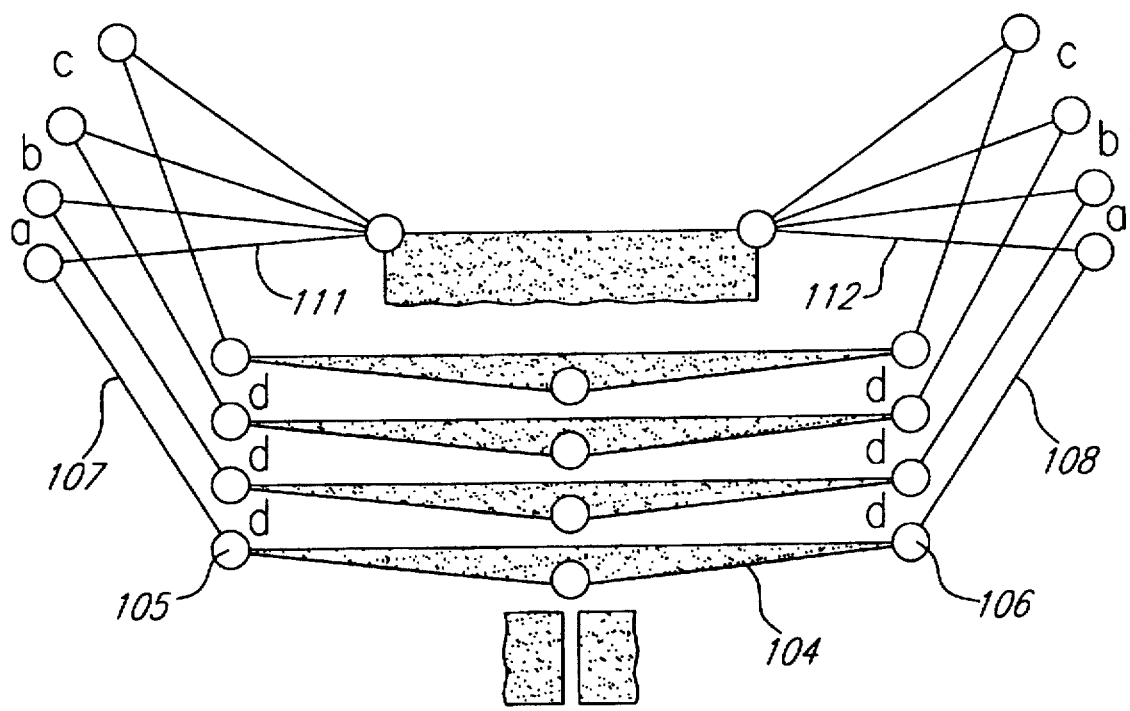
FIG. 16 is an illustration of the increasing displacement ratio of the transmission, for the second embodiment.

Referring to FIG. 15, two important principles have to be mentioned. First, the natural compensation of underactuated fingers means that the grasping forces on the object will be larger when a finger moves away from the palm or from the opposing finger although the actuating force at joint 113 or 114 is the same. Second, referring to FIG. 16, the disposition of the bars 107 and 111 on left side, and 108 and 112 on right side will make the rotation of bars 111 and 112 faster as they move from a to b and to c, for a same displacement d of the differential lever 104. These two principles tend to increase the grasping forces of a finger when it moves away from the other finger, following the conservation of energy. The finger moves slower when it is located away from the other finger, for the same displacement of joint 105 or 106. If the object 125 is pushed by an external force towards the right, the finger 142 will tend to move backwards, which pushes the joint 106 down. If the actuator is maintained in position, the joint 103 does not move and the joint 105 will move up as much as the joint 106 moves down. The finger 141 will then move towards the object. When the system is not centered, the finger 141 moves forward faster than the finger 142 moves backwards, due to the principle explained above, which causes a tighter grasping of the object and tends to stop the motion caused by the external push on the object.

Coupling of the Orientation of the Fingers

In the second embodiment, as well as in the preferred embodiment, the rotational motion of the fingers can also be coupled in order to reduce the number of actuators.

Referring to FIG. 17, the working principle of the mechanism providing a coupled orientation of the fingers is described. The three bases of fingers 131, 132 and 133 are attached to the frame 130 illustrated by a triangle. The bases rotate around the vertices of the triangle. The base of the finger 133 is preferably actuated by the actuator.

The motion of the base of the finger 132 is coupled to the motion of the base 133 by the four-bar mechanism 130-137-138-139. The two important positions are the extreme configurations C and S, since the finger 132 is not useful during the configuration P. A mechanical limit stops the closing of the finger 132 in the configuration P. At these two extreme positions, the two bases have symmetrical orientations with respect to a central vertical axis.

The motion of the base of the finger 131 is coupled to the motion of the base of the finger 133 by the four-bar mechanism 130-134-135-136. In the configuration C, the bases 133 and 131 are perpendicular to a horizontal axis for the cylindrical grasp. In the configuration P, the bases 133 and 131 are facing each other for the planar grasp. In the configuration S, the bases 133 and 131 are towards the center of the hand for the spherical grasp.

Discussion of Some Variant Embodiments

As can be appreciated, the arrangement of drive or return links as described above could be replaced by tendon or gear systems. Furthermore, adjustment of the stopper 27 can be used to adjust the angle of the third phalanx 4 with respect to the palm 1, as well as disabling the return mechanism if desired.

Additionally, the mechanisms described above could be extended to underactuacted fingers with more than three phalanges. The return mechanism could then be used to maintain either the last phalanx orthogonal to the palm or a group of distal phalanges orthogonal to the palm.

We claim:

1. A mechanical finger comprising:

mounting means for mounting said finger to a mechanical palm of a gripping mechanism, said palm having a palm plane;

a first phalanx pivotally connected at a proximal end by said mounting means to said palm;

a second phalanx pivotally connected at a proximal end to a distal end of the first phalanx;

a third phalanx pivotally connected at a proximal end to a distal end of the second phalanx, said first, second and third phalanges pivoting about parallel pivot axes;

a differential driving actuation means connected to said first, second and third phalanges and a controllable actuator mounted to said palm, said actuation means either causing said first phalanx to pivot or said second phalanx to pivot depending on load on said first phalanx, and either causing said second phalanx to pivot or said third phalanx to pivot depending on load on said second phalanx, said first phalanx being pivoted by said differential actuator means before said second phalanx in absence of load on said first phalanx, and said second phalanx being pivoted by said differential actuator means before said third phalanx in absence of load on said second phalanx; and a return actuation means connected to said palm and said first, second and third phalanges for maintaining a contact surface of said third phalanx substantially orthogonal to said palm plane during movement of said controllable actuator when said first and second phalanges are under no load;

wherein said driving actuation means comprises;
first and second drive links pivotally connected at a radially inner end to said first and second phalanges respectively to pivot about said pivot axes thereof;
a first drive coupling link pivotally connected at one end to said first drive link and at an opposite end to said second drive link; and
a second drive coupling link pivotally connected at one and to said second drive link and at an opposite end to said third phalanx;
said first drive link being connected to said controllable actuator, whereby said driving actuation means requires only four pivotally connected links to drive said phalanges.

2. The mechanical finger as claimed in claim 1, wherein said first coupling link is connected at said one end to a radially outer end of said first drive link and at said opposite end to a middle of said second drive link, said second coupling link is connected at said one end to a radially outer end of said second drive link, and said controllable actuator is connected to a middle of said first drive link.

3. The mechanical finger as claimed in claim 2, wherein said return actuation means comprises:
first and second return links pivotally connected at a radially inner end to said first and second phalanges respectively to pivot about said pivot axes thereof;
a first return coupling link pivotally connected at one end to said first return link and at an opposite end to said second return link;
a second return coupling link pivotally connected at one end to said second return link and at an opposite end to a return distal abutment link;
a palm abutment mounted to said palm;
first biasing means for biasing said first return link against said palm abutment; and
second biasing means for biasing said third phalanx against said return distal abutment link, whereby said return actuation means requires only five pivotally connected links to maintain said third phalanx orthogonal to said palm.

4. The mechanical finger as claimed in claim 3, wherein said first return coupling link is connected at said one end to a radially outer end of said first return link and at said opposite end to a radially outer end of said second return link, said second return coupling link pivotally connected at said one end radially inwardly from said radially outer end of said second return link.

5. The mechanical finger as claimed in claim 2, wherein said differential driving actuation means includes a biasing means for biasing said second phalanx to open with respect to said first phalanx.

6. The mechanical finger as claimed in claim 1, wherein said return actuation means comprises:
first and second return links pivotally connected at a radially inner end to said first and second phalanges respectively to pivot about said pivot axes thereof;
a first return coupling link pivotally connected at one end to said first return link and at an opposite end to said second return link;
a second return coupling link pivotally connected at one end to said second return link and at an opposite end to a return distal abutment link;
a palm abutment mounted to said palm;
first biasing means for biasing said first return link against said palm abutment; and
second biasing means for biasing said third phalanx against said return distal abutment link, whereby said return actuation means requires only five pivotally connected links to maintain said third phalanx orthogonal to said palm.

7. The mechanical finger as claimed in claim 6, wherein said first return coupling link is connected at said one end to a radially outer end of said first return link and at said opposite end to a radially outer end of said second return link, said second return coupling link pivotally connected at said one end radially inwardly from said radially outer end of said second return link.

8. The mechanical finger as claimed in claim 1, wherein said phalanges comprise hyperextension preventing stop means.

9. The mechanical finger as claimed in claim 8, wherein said differential driving actuation means includes a biasing means for biasing said second phalanx to open with respect to said first phalanx.

10. The mechanical finger as claimed in claim 1, wherein said differential driving actuation means includes a biasing means for biasing said second phalanx to open with respect to said first phalanx.

11. The mechanical finger as claimed in claim 1, wherein said palm mounting means are pivotable about an axis orthogonal to said palm plane.

12. The mechanical finger as claimed in claim 1, wherein at least one of said phalanges includes tactile sensors.

13. The mechanical finger as claimed in claim 1, wherein said controllable actuator is an underactuated differential controllable actuator connected to a plurality of mechanical fingers.

14. A mechanical finger comprising:
mounting means for mounting said finger to a mechanical palm of a gripping mechanism, said palm having a palm plane;
a first phalanx pivotally connected at a proximal end by said mounting means to said palm;
a second phalanx pivotally connected at a proximal end to a distal end of the first phalanx;
a third phalanx pivotally connected at a proximal end to a distal end of the second phalanx, said first, second and third phalanges pivoting about parallel pivot axes;
a differential driving actuation means connected to said first, second and third phalanges and a controllable actuator mounted to said palm, said actuation means either causing said first phalanx to pivot or said second phalanx to pivot depending on load on said first phalanx, and either causing said second phalanx to pivot or said third phalanx to pivot depending on load on said second phalanx, said first phalanx being pivoted by said differential actuator means before said second phalanx in absence of load on said first phalanx, and said second phalanx being pivoted by said differential actuator means before said third phalanx in absence of load on said second phalanx; and
a return actuation means connected to said palm and said first, second and third phalanges for maintaining a contact surface of said third phalanx substantially orthogonal to said palm plane during movement of said controllable actuator when said first and second phalanges are under no load;
wherein said return actuation means comprises:
first and second return links pivotally connected at a radially inner end to said first and second phalanges respectively to pivot about said pivot axes thereof;

a first return coupling link pivotally connected at one end to said first return link and at an opposite end to said second return link;

a second return coupling link pivotally connected at one end to said second return link and at an opposite end to a return distal abutment link;

a palm abutment mounted to said palm;

first biasing means for biasing said first return link against said palm abutment; and second biasing means for biasing said third phalanx against said return distal abutment link, whereby said return actuation means requires only five pivotally connected links to maintain said third phalanx orthogonal to said palm.

15. The mechanical finger as claimed in claim 14, wherein said first return coupling link is connected at said one end to a radially outer end of said first return link and at said opposite end to a radially outer end of said second return link, said second return coupling link pivotally connected at said one end radially inwardly from said radially outer end of said second return link.

16. The mechanical finger as claimed in claim 14, wherein said phalanges comprise hyperextension preventing stop means.

17. The mechanical finger as claimed in claim 16, wherein said differential driving actuation means includes a biasing means for biasing said second phalanx to open with respect to said first phalanx.

18. The mechanical finger as claimed in claim 14, wherein said differential driving actuation means includes a biasing means for biasing said second phalanx to open with respect to said first phalanx.

* * * * *